ent Number: 4,980,626

United States Patent [19]
Hess et al.

[11] Patent Number: 4,980,626
[45] Date of Patent: Dec. 25, 1990

[54] METHOD AND APPARATUS FOR POSITIONING A ROBOTIC END EFFECTOR

[75] Inventors: Clifford W. Hess; Larry C. H. Li, both of Houston, Tex.

[73] Assignee: The United States of America as represented by the Administrator of the National Aeronautics and Space Administration, Washington, D.C.

[21] Appl. No.: 392,235

[22] Filed: Aug. 10, 1989

[51] Int. Cl.$^5$ ............................................. G05B 19/12
[52] U.S. Cl. ........................... 318/568.16; 318/568.21; 318/568.20; 901/33; 901/37; 901/47; 364/513; 250/561
[58] Field of Search ............................... 318/560–573, 318/630–632, 640; 364/513; 901/30–37, 46, 47

[56] References Cited

U.S. PATENT DOCUMENTS

| | | | |
|---|---|---|---|
| Re. H,65 | 5/1986 | Beni et al. | 901/35 X |
| 2,567,066 | 9/1951 | Goldman | 3/12 |
| 3,423,765 | 1/1969 | Salisbury, Jr. | 3/1.1 |
| 3,751,733 | 8/1973 | Fletcher et al. | 901/33 X |
| 3,888,362 | 6/1975 | Fletcher et al. | 901/35 X |
| 4,260,187 | 4/1981 | Bejczy | 294/86 R |
| 4,575,297 | 3/1986 | Richter | 901/34 X |
| 4,591,198 | 5/1986 | Monforte | 901/37 X |
| 4,593,191 | 6/1986 | Alles | 901/47 X |
| 4,602,163 | 7/1986 | Pryor | 250/561 |
| 4,634,947 | 1/1987 | Magori | 318/568.16 |
| 4,641,251 | 2/1987 | Inoue | 364/513 |
| 4,650,492 | 3/1987 | Barkhordar et al. | 901/33 X |
| 4,660,829 | 4/1987 | Whiteneir | 273/29 A |
| 4,668,861 | 5/1987 | White | 901/33 X |
| 4,674,057 | 6/1987 | Caughman et al. | 364/513 |
| 4,694,231 | 9/1987 | Alvite | 318/568.11 |
| 4,718,023 | 1/1988 | Arora | 364/513 |
| 4,766,322 | 8/1988 | Hashimoto | 364/513 X |
| 4,814,562 | 3/1989 | Langston | 901/33 X |
| 4,852,928 | 8/1989 | Monforte | 901/37 X |

FOREIGN PATENT DOCUMENTS

| | | | |
|---|---|---|---|
| 0045174 | 2/1982 | European Pat. Off. | 901/47 |
| 3730396 | 3/1989 | Fed. Rep. of Germany | 901/47 |
| 0080710 | 7/1981 | Japan | 901/47 |

OTHER PUBLICATIONS

Charles Wampler, "Multiprocessor Control of a Telemanipulator with Optical Proximity Sensors", The International Journal of Robotics Research, vol. 3, No. 1, Spring 1984, pp. 40, 41, 43–50.

Primary Examiner—William M. Shoop, Jr.
Assistant Examiner—Paul Ip
Attorney, Agent, or Firm—Hardie R. Barr; John R. Manning; Edward K. Fein

[57] ABSTRACT

A robotic end effector and operation protocol provide for a reliable grasp of a target object irrespective of the target's contours. A robotic hand 30 includes a plurality of jointed fingers 31–34, one of which, like a thumb 31, is in opposed relation to the other. Each finger comprises at least two jointed sections, and is provided with reflective proximity sensors, one on the inner surface of each finger section. Each proximity sensor comprises a transmitter of a beam of radiant energy and a receiver for receiving reflections of the transmitted energy when reflected by a target object. On the fingers opposed to the thumb, the proximity sensors 41 on the outermost finger sections are aligned in an outer sensor array and the sensors 42 on the intermediate finger sections and sensors 43 on the innermost finger sections are similarly arranged to form an intermediate sensor array and an inner sensor array, respectively. The invention includes a computer system 55 with software and/or circuitry 56 for a protocol comprising the steps in sequence of (1) approach axis alignment to maximize the number of outer layer sensors which detect the target; (2) non-contact contour following of the target by the robot fingers to minimize target escape potential; and (3) closing to ridigize the target including dynamically re-adjusting the end effector finger alignment to compensate for target motion. A signal conditioning circuit 52 and gain adjustment 57 are included to maintain the dynamic range of low power reflection signals.

15 Claims, 7 Drawing Sheets

METHOD AND APPARATUS FOR POSITIONING A ROBOTIC END EFFECTOR

ORIGIN OF THE INVENTION

The invention described herein was made by employees of the U.S. Government and may be manufactured and used by or for the Government of the United States of America for governmental purposes without the payment of any royalties thereon or therefor.

FIELD OF THE INVENTION

This invention relates to robotic systems and more particularly to a method and apparatus for autonomous control of a dexterous robotic end effector using proximity sensors to minimize target escape potential during grasping.

BACKGROUND ART

There are many and diverse systems for the manipulation and operation of robotic end effectors which are subject to control by a human operator relying on visual observation or television viewing of the target. Where such means of control are impractical, systems have been devised which employ proximity sensors for providing sensory input signals regarding the location and relative orientation of the target with respect to the end effector. Such sensors are frequently of the non-contact type which send energy pulses or beams, typically optical or ultrasonic, to a target to be grasped. The sensors are adapted to receive reflected energy from the target and generate electrical signals in response thereto and from which ranging and direction information can be input to an automatic control system or employed by a human operator for adjusting the orientation and range positioning of the end effector with respect to the target.

Another known method and system for positioning and controlling a robotic hand in the act of grasping a target employs the beam break technique in which optical beams are established between the fingers of the end effector. Interruption of the optical beams as the target enters the grasp region is used to signal the end effector to close and it can also be used to command the end effector to open. A disadvantage of the beam break technique is that it does not provide range information which is necessary for the proper positioning of the end effector with respect to the target. Since the proximity sensor's transmitter and receiver are located on different fingers of the robotic hand, proper alignment between the transmitter and receiver becomes critical since improper alignment limits the end effector finger motion and also limits the possible grasp configurations of the robotic hand. With such limitations, a successful reliable grasp of the target may be extremely difficult, if not impossible. The beam break technique can also produce a premature closure of the end effector if the target enters the grasp region at a low speed.

U.S. Pat. No. 3,423,765 discloses a prosthetic device with contact sensor means in the finger tips of a robotic hand for signaling slippage from the grasp of the device and responsive electronic means for controlling the grasping action.

U.S. Pat. No. 4,674,057 uses ultrasonic ranging transducers on the end of a robotic arm in a safety system for sensing obstruction to the motion of the robotic arm and for halting operations until the obstruction is removed.

U.S. Pat. No. 4,718,023 discloses apparatus for positioning a robot hand at a predetermined distance and orientation with respect to a reference surface and which includes transducers for sending acoustic pulses and receiving reflected signals.

U.S. Pat. No. 4,660,829 discloses a system for body joint position monitoring wherein light emitting diodes on one body member transmit light beams for detection by an array of photocells on the other body joint member.

U.S. Pat. No. 4,602,163 utilizes an external reference coordinate system wherein laser beams in orthogonal planes are directed by mirrors to detectors on a robot hand which transmit signals to a robot control system.

U.S. Pat. No. 4,260,187 discloses a system wherein four distance measuring sensors located on an end effector at the corners of an imaginary square detect target distances. The detector signals are used in a control system for adjusting orientation of the end effector.

A publication by Charles Wampler, "Multiprocessor Control of a Telemanipulator with Optical Proximity Sensors", The International Journal of Robotics Research, Vol. 3, No. 1, Spring 1984, discloses a telemanipulator equipped with optical proximity sensors and a multiprocessor in a closed-loop control system.

U.S. Pat. No. 3,888,362 discloses apparatus for grasping an article with a system which controls positioning and orienting of the end effector prior to a final grasping action. Light emitting diodes on orthogonal axes of the grasping element are sequentially energized and the light therefrom reflected by the target to a photosensor. Signals from four quadrants of the photosensor are used to align orthogonal axes of the sensor with the target axes.

U.S. Pat. No. 2,567,066 discloses a robotic hand with solenoids located on each finger in inner and outer rows, of which rows may be sequentially activated by a human operator to work the finger joints to release an object.

In many of the foregoing disclosures, it is to be noted that a target of specific size and configuration is oftentimes required for an end effector to effect a reliable grasp of the targets. Also there is no capability for providing an autonomous, non-contact, prepositioning of a dexterous robotic end effector with respect to targets of different shapes and contours so as to minimize target escape potential during grasping.

SUMMARY OF THE INVENTION

The present invention relates to a robotic end effector and operation protocol for effecting a reliable grasp of a target object irrespective of the targets contours. In one embodiment, the invention comprises an end effector in the form of a robotic hand having a plurality of jointed fingers, one of which, like a thumb, is in opposed relation to the others. Each finger is comprised of at least two, preferably three jointed sections, and provided with reflective proximity sensors, one on the inner surface of each finger section. Each proximity sensor comprises a transmitter for transmitting a beam of radiant energy and receiving means for receiving reflections of the transmitted energy when intercepted and reflected by a target object and for generating electrical signals responsive thereto. On the thumb finger, the proximity sensors are arranged so that when in its straightened condition, the energy beams eminate therefrom in substantially co-planar parallel relationship and, as the thumb is closed, are moved towards convergence in the direction of the palm of the robotic hand. On the remaining fingers, the proximity sensors on the outermost finger sections (finger tips) are aligned in an outer sensor array and the sensors on the intermediate sections of the fingers and innermost finger sections are similarly arranged to comprise an intermediate sensor array and an inner sensor array, respectively. The invention includes a computer control system for determining range to target for each proximity sensor in response to the signal of reflected energy received from each proximity sensor and includes grasp protocol software and/or circuitry responsive to the reflection signal for orienting the approach axis alignment of the end effector with respect to the target object to maximize the number of outer layer sensors which are triggered by a detection of reflected energy. Once the approach axis is properly aligned in normal relationship to the target's principal axis for most cases, the grasp protocol software and/or circuitry permits the inner and outer layers of proximity sensors to monitor the distance between the associated finger segment and target and directs the fingers to follow the target contours so as to wrap around the target as much as possible without contacting the target or alternatively, for large targets, to expose the largest grasp surface available to the end effector and thereby, in either case, minimizing the pre-grasp target escape potential. After the target is trapped or its contours matched to expose maximum grasp surface, protocol software and/or circuitry is provided for controlling the fingers to close on and rigidize the target while dynamically readjusting the end effector finger alignment to compensate for target motion. Signal conditioning and gain adjustment means are also provided for maintaining the dynamic range of low powered reflection signals.

Referring more particularly to the drawings, there is shown in FIGS. 1(a) through 1(d) a conventional dexterous robotic end effector 10 in the process of approaching and grasping a target object by using the beam break technique of the prior art. The illustration of this prior art technique and the sequence protocol employed therein reveals its limitations and associated problems which the present invention is designed to alleviate. The end effector 10, in the form of a dexterous robotic hand, is provided with articulated fingers 11,12,13 and an opposing finger or thumb 14, each having three jointed sections similar in form to a human finger. Three light beams 15a,15b,15c, indicated by dashed lines in the drawings, are established between the tip of the thumb 14 and the tips of fingers 11,12 and 13, respesctively. For each beam, an appropriate light source may be a light emitting diode mounted on the tip of thumb 14. For beam receivers a phototransistor or similar device is mounted in the tip of each finger 11,12 and 13.

Figure 1A:
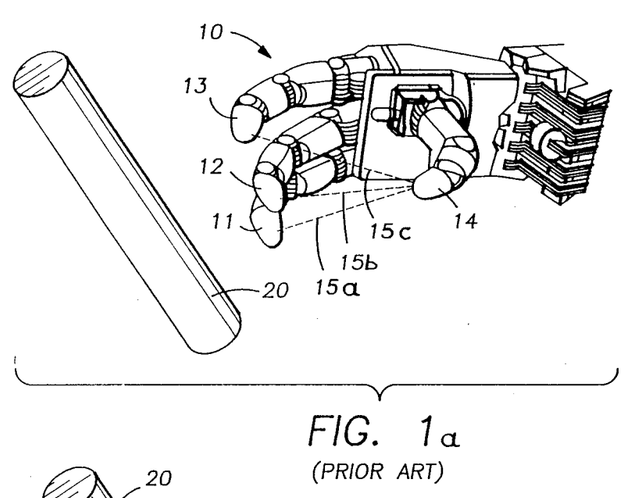
FIGS. 1(a) through 1(d) illustrate procedural steps employed in the prior art beam break technique for grasping a target by a robotic hand equipped with means establishing optical beams, between the thumb and fingertips.
Figure 1B:
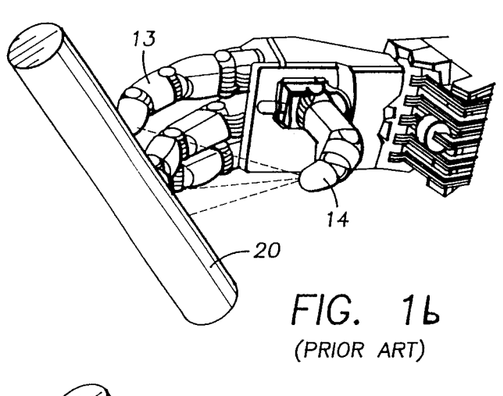
Figure 1C:
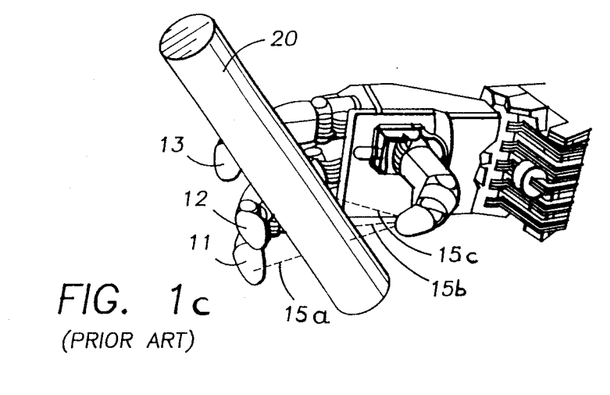
Figure 1D:
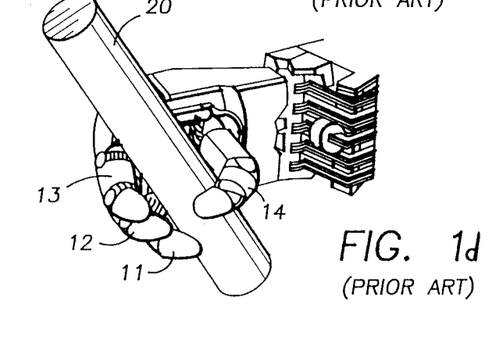

Problems associated with the prior art are illustrated by the following scenario:

FIG. 1(a) illustrates the initial approach of the robotic hand10 to an elongate cylindrical object 2( to be grasped thereby. It is to be understood that the robotic hand 10 is guided in its approach by an appropriate manipulator arm (not shown). The approach is directed o that the finger tips and thumb tip of the robotic hand 10 are guided towards opposite sides of the object 20, such as seen in FIG. 1(b). As the approach continues, the light beams are interrupted, FIG. 1(c), and electrical signals generated in response to the interruptions activate control mechanisms (not shown) for causing the fingers and thumb to pivot about their joints and close inwardly towards one another to thereby grasp the object 20, as shown in FIG. 1(d). However, if the relative movement of the robotic hand 10 and target object 20 in the direction towards one another is at too low a speed, the closure of the fingers of the end effector may be premature such that none of the fingers grasp the object or possibly only one or two succeed, thus resulting in failure or an unreliable grasp. Either of these possibilities are likely occurrences if the robotic hand 10 and object 20 are improperly aligned in the approach sequence.

The present invention is designed to overcome or minimize problems associated with the beam break technique. The apparatus of the present invention, shown schematically in FIG. 2, includes a dexterous robotic end effector in the form of a robotic hand 30 having a plurality of articulated fingers 31,32,33 and 34 which are adapted to be controlled to close toward the palm 36 of the robotic hand. One of the fingers 31, like a thumb, is disposed in opposed relation to the other fingers, and is adapted to close toward the other fingers. It is to be understood that the number of joints and fingers on the robotic hand may be other than shown, depending on the type of end effector employed and its particular application. In any event, at least two fingers in opposed relationship is a minimum requirement.

Figure 2:
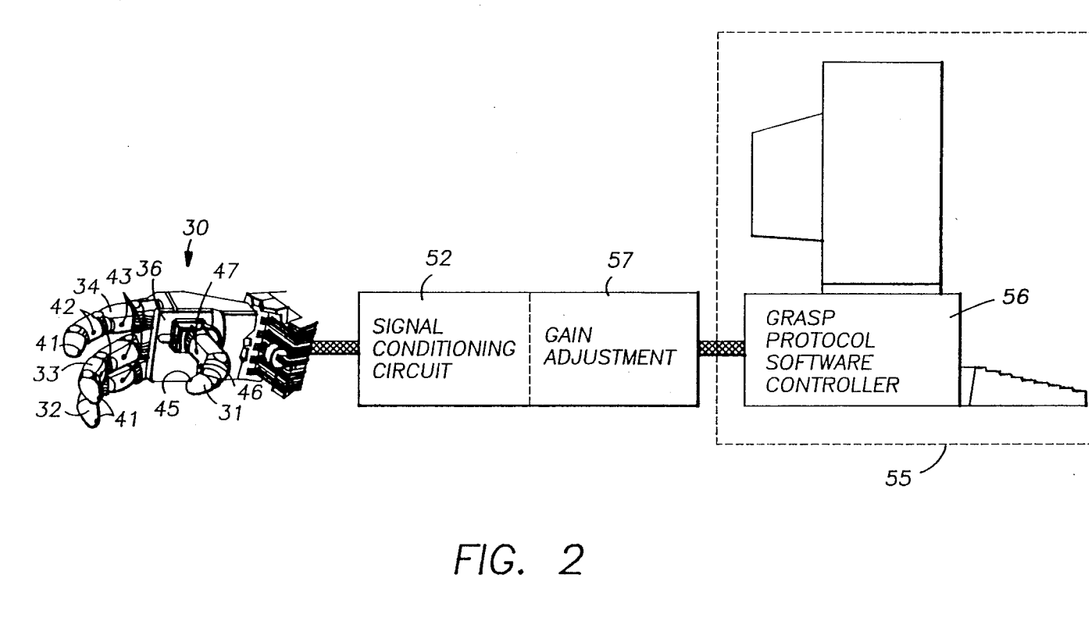
FIG. 2 is a schematic functional diagram of the apparatus of the present invention.

Each of the fingers 32,33,34 and thumb 31 are comprised of three jointed sections and are normally disposed in the extended straightened condition. The fingers 32,33,34 are each provided with three proximity sensors 41,42,43. The proximity sensors 41 are mounted in linear array, one each on the inner surface of the outermost section of each finger and together form an outer layer of proximity sensors. The sensors 42 form an intermediate linear array of sensors which are mounted on the inner surfaces of the middle sections of the finger 32,33 and 34. The sensors 43 are mounted on the innermost sections of the fingers on the inner surfaces thereof and together form an inner array of sensors. Each of the proximity sensors is comprised of an energy beam transmitter and receiver in juxtapostion and typically comprises a light emitting diode and a phototransistor receiver. The proximity sensors are so mounted that for each array, the beams, shown in dashed lines in the drawings, emanate therefrom in a substantially parallel co-planar direction. As the fingers move in a closing maneuver, pivoting action of the finger joints cause the beams as they are transmitted in each array to move from their parallel relationship to converge and the point of convergence for each array to swing in arcuate movement towards the palm 36 of the robotic hand.

The thumb 31 is also provided on its inner surfaces with proximity sensors 45,46,47, one for each of its three thumb sections with sensor 45 mounted on the thumb tip, sensor 46 mounted on the middle section of the thumb and sensor 47 mounted on its innermost section. In the straightened condition of the thumb, the energy beams from the thumb sensors 45,46, 47 emanate therefrom in substantially parallel co-planar relationship in the direction of the opposing fingers 32,33,34. As the thumb 31 moves in a closing maneuver, pivoting action of the thumb joints causes the energy beams from the thumb sensors to move from their parallel relationship to converge towards the palm 36 as the thumb continues to close.

The devices for controlling the pivotal action of the finger joints are adapted to respond to a signal of a predetermined range from a target object. When the proximity sensors are moved into the vicinity of a target object such that their radiant energy beams are reflected lack to the sensor, range to target information is determined therefrom by appropriate signal conditioning circuitry 52 and a computer system 55 which is provided with grasp protocol software and/or circuitry 56. A programmable gain adjustment program circuit 57 is provided for the signal conditioning circuit to adjust signal strength which varies inversely with range to target.

Figure 3A:
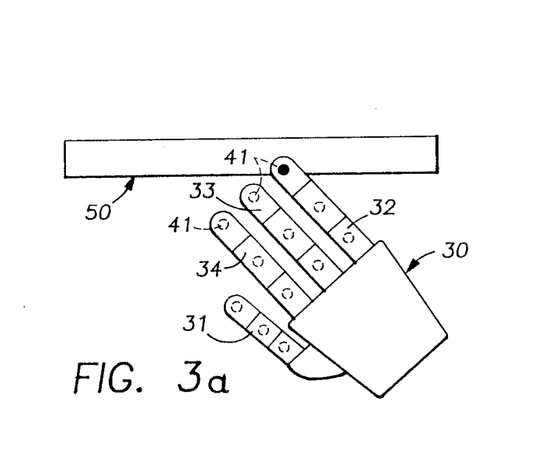
FIGS. 3(a) through 3(d) illustrate the approach axis alignment procedure in a protocol for sequencing the proper use of the sensors and end effector of the invention.
Figure 3B:
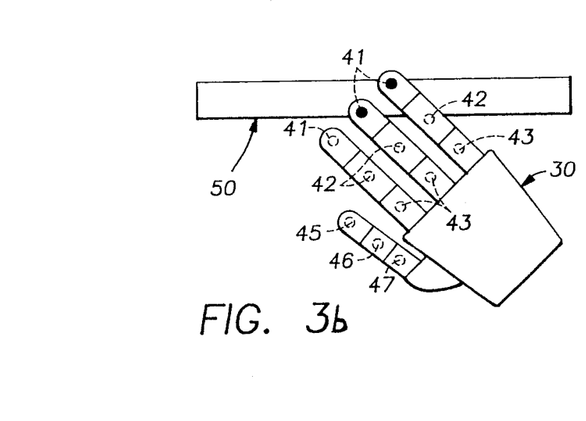
Figure 3C:
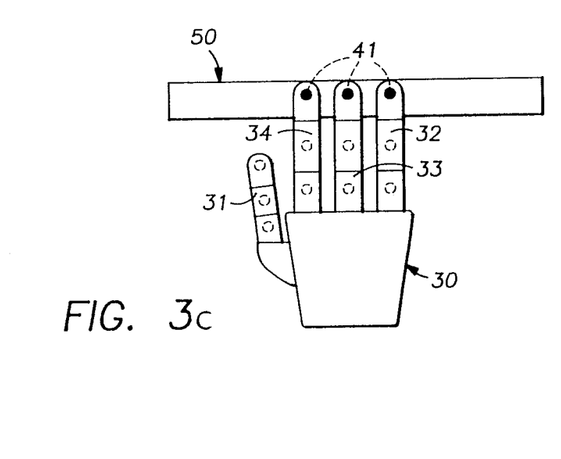
Figure 3D:
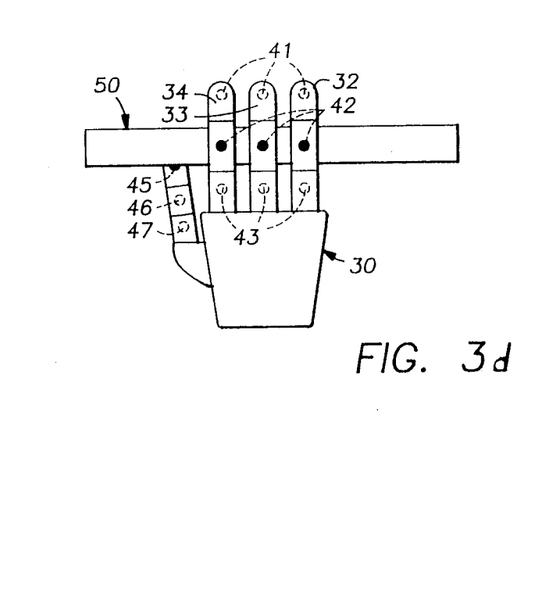

The invention includes use of a protocol to sequence the proper use of the end effector and its reflective proximity sensors. For example, the initial step of the protocol is an approach axis alignment illustrated schematically in FIGS. 3(a) through 3(d). In FIG. 3(a), the robotic hand 30 is shown approaching a target object 50, which for purposes of illustration, is an elongate cylindrical object such as a rod or pipe. It is to be understood that the robotic hand 30 is attached to a manipulator arm (not shown) guided by an appropriate control mechanism, which may be subject to control of a human operator or other means of control. Also, the target object 50 may have a configuration other than that shown. As the range to target closes, it is detected first by the outer layer of proximity sensors 41. If the approach to the target, or its configuration is such, that one of the end sensors in the outer layer first detects the target, as indicated by a black dot in the drawing, the approach axis is re-oriented by means of the grasp protocol controller in the computer control system 55 so as to maximize the number of outer layer sensors that are triggered. This situation is illustrated in FIG. 3(a) wherein first detection is made by one of the end sensors in the outer layer of sensors 41 whereby the robotic hand 30 in response to the computer system 55 is then rotated in a clockwise direction, as shown in FIG. 3(b), to where an additional sensor and eventually all sensor in the outer layer are able to detect the target, as shown in FIG. 3(c). If the initial approach had been such that all sensors in the outer layer were triggered substantially simultaneously, then the end effector's approach axis would be, in most cases, normal to the target's principal axis and the approach would have been a good one. With all of the sensors 41 in the outer layer triggered, the end effector 30 continues its approach to successively trigger the intermediate layer of sensors 42, as shown in FIG. 3(d) The end effector 30 further continues its approach and begins the contour following and trapping procedure, as illustrated respectively in FIGS. 4(a) through 4(c), for various target shapes (60,61,62), under the control of computer system 55.

Figure 4A:
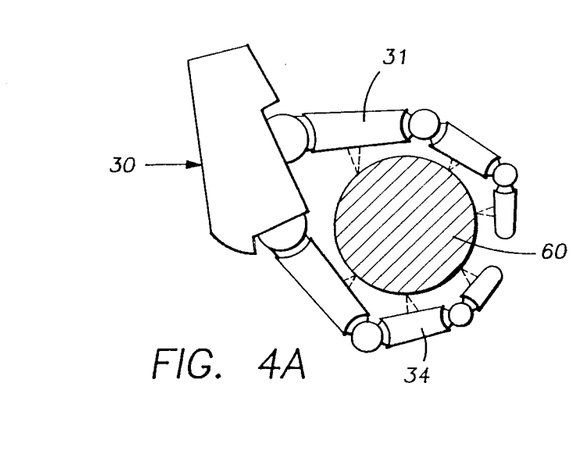
FIGS. 4(a) through 4(c) illustrate contour following of several types of target shapes by the fingers of the robotic hand of the invention after the approach axis has been properly aligned.
Figure 4B:
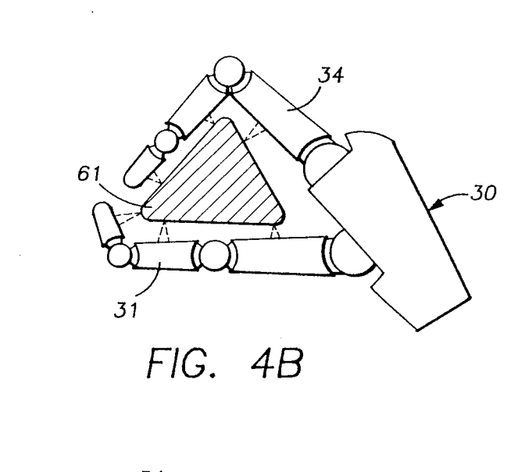
Figure 4C:
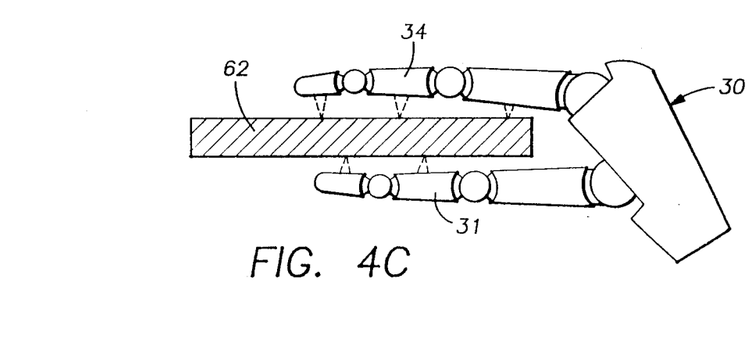

Once the approach axis is properly aligned, the end effector's fingers wrap around the target as much as possible without coming in contact with the target. This is possible because each movable finger segment will have a proximity sensor monitoring the distance between the segment and the target. These proximity sensors are typically the inner and outer layer sensors. With multiple segments in each finger, and each segment's sensor tracking its own distance, the fingers may essentially follow the target contour without touching. This concept is illustrated in FIG. 4(a) where the target 60 is of circular cross section, in FIG. 4(b) where the target 61 is triangular in cross section, and in FIG. 4(c) where the target 62 is of rectangular cross section, such as typical of a panel, an elongate beam, or the like. During the contour following procedure, the sensors on each finger segment maintain a fixed distance from the target, which essentially allows the fingers to wrap themselves around the target or at least isolate and envelope a large grasp area on the target. The contour following procedure thus serves to minimize the pre-grasp target escape potential because it uses the fingers to form a trap around the target. If an effective trap can not be achieved because the target is too large, contour following will still expose the largest grasp surface available to the end effector.

The publication by Charles Wampler in The International Journal of Robotics Research, Vol. 3, No. 1, Spring 1984 entitled "Multiprocessor Control of a Telemanipulator with Optical Proximity Sensors" discloses a computer-assisted telemanipulator equipped with optical proximity sensors and a multiprocessor control system wherein digital control techniques are used in application to a surface-following task. Such techniques are known in the art and this paper is cited as one example of this technique. Such techniques may be employed in the contour following procedure referred to above.

Figure 5A:
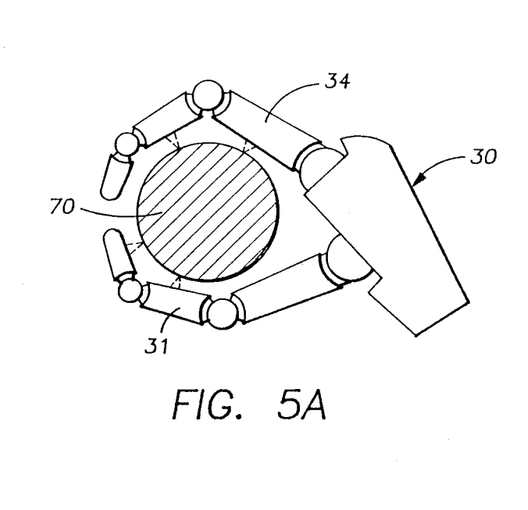
FIGS. 5(a) and 5(b) illustrate the trapping concept demonstrated on two different shaped objects by the robotic fingers of the invention.
Figure 5B:
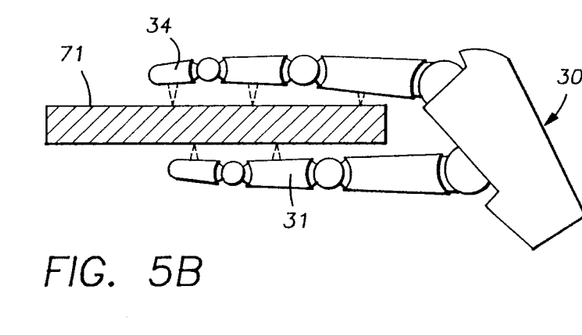

In FIG. 5(a) there is illustrated an effective trap with a maximum grasp surface on a target 70 of circular cross section. FIG. 5(b) is an illustration of an ineffective trap on a target 71, wherein the target has a relatively long rectangular cross section, but nevertheless a maximum grasp surface is provided for the end effector. In conventional systems for control of robotic end effectors wherein the technique of contour following is not a capability, an ineffective trap of the target is a frequent result and the grasp surface is not optimized.

Figure 6:
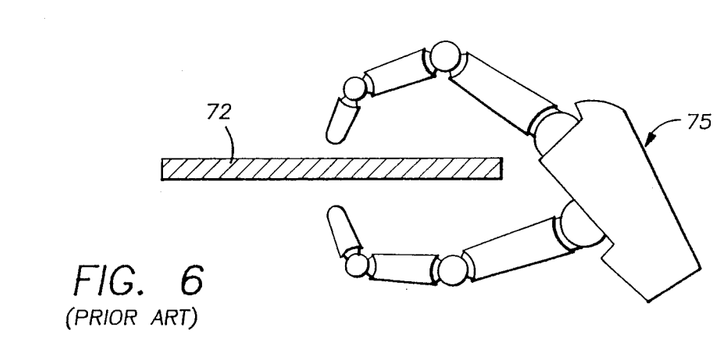
FIG. 6 illustrates an ineffective trap of a target object by a robotic hand of conventional design.

A typical result when using such a conventional system is illustrated in FIG. 6, wherein a robotic hand 75 makes an ineffective trap of a target 72. Since the grasp is made by the finger tips, the grasp surface is undesirably minimal.

Figure 7A:
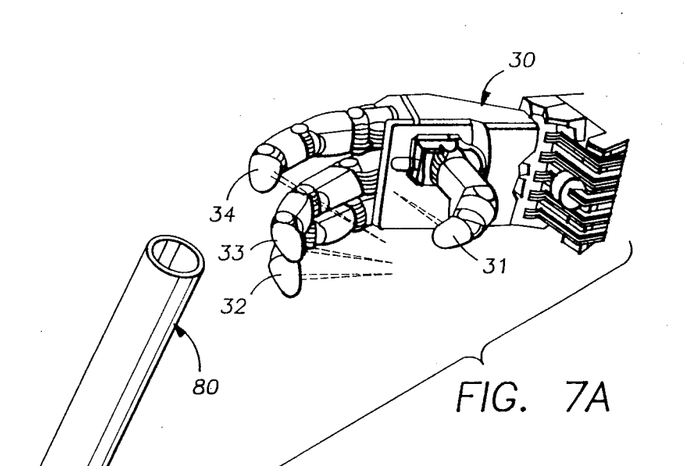
FIGS. 7(a) through 7(d) illustrate the concept of dynamic re-orientation as practiced by the robotic end effector of the invention during the act of closing its grasp on a target object.
Figure 7B:
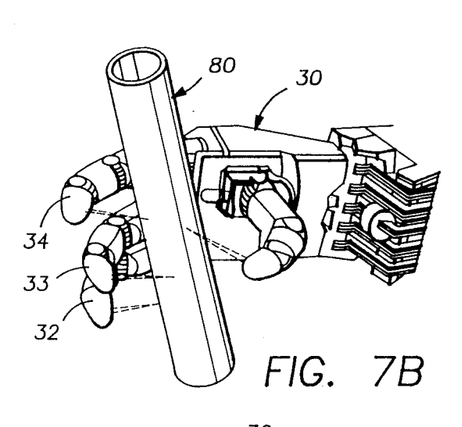
Figure 7C:
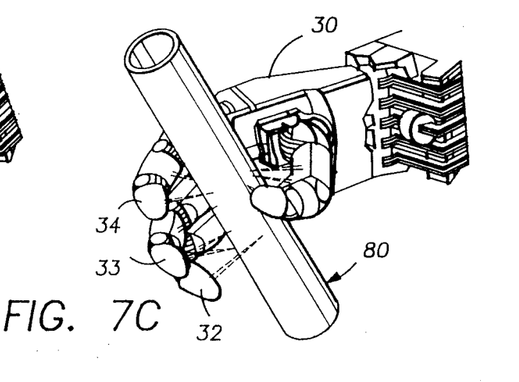
Figure 7D:
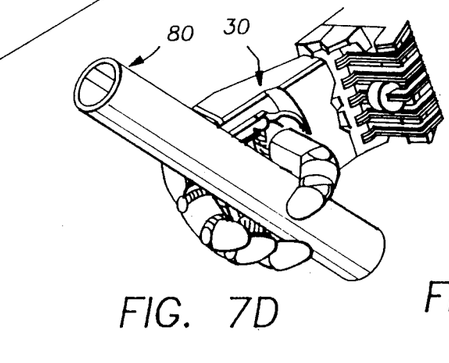

With the present invention, after the target is trapped by the end effector 30 and has its contour followed by the robotic fingers to expose and envelop maximum grasp surface, the fingers may be moved in to rigidize the target if grasping is desired. During the transition, the proximity sensors on the finger segments continuously monitor the distances while the fingers gradually come to a closed position. With the proximity sensors, the end effector 30 can compensate for any small target motion that may exist during the act of grasping by dynamically re-adjusting the end effector or finger alignment to achieve the best orientation. This concept is illustrated in FIGS. 7(a) through 7(d) wherein a target 80 of elongate cylindrical form is in motion about an axis transverse to its longitudinal axis, and the sequence illustrates how the end effector 30 dynamically re-orients itself using its proximity sensors to match the target orientation, and eventually rigidize the target. The protocol sequence of initial approach to the target, axis alignment, and contour following of the target 80 while the target is in motion, are illustrated in FIGS. 7(a), 7(b) and 7(c), respectively. The act of closing on the target and rigidizing the target is shown in FIG. 7(d). Once the fingers contact the target, the fingers apply a predetermined amount of force controlled by the grasp control software in the computer system 55 to rigidize the target and complete the grasp operation.

It will therefore be noted that the present invention uses reflective proximity sensors to provide end effector and finger alignment as well as to detect the target's presence and its contour. The ability to track the target's contour leads to the trapping and contour following capability. With these features, the invention can minimize the target escape potential during the act of grasping. Also, the use of reflective proximity sensors eliminates the sensor alignment problem since the transmitter and the receiver are co-located on the same finger, therefore, no direct path between fingers needs to be established.

The invention uses multiple layers of sensors to detect a target's presence, and provide approach axis alignment and contour following in accordance with grasp protocol software in the computer system 55. Having multiple layers of sensors eliminates the problem of premature closure of the end effector. The outer layer serves to align the approach axis and provide an alert of target's presence. Once alerted, the end effector will not close until subsequent layers of sensors 42,43 are also triggered.

Figure 8A:
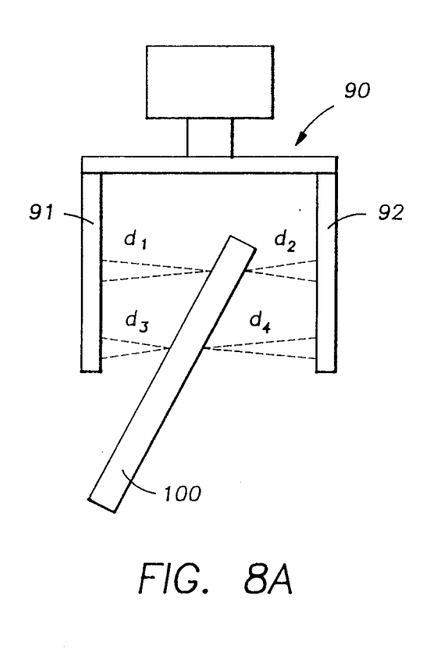
FIGS. 8(a) and 8(b) illustrate an industrial application of the invention in embodiment of an industrial parallel jaw gripper.
Figure 8B:
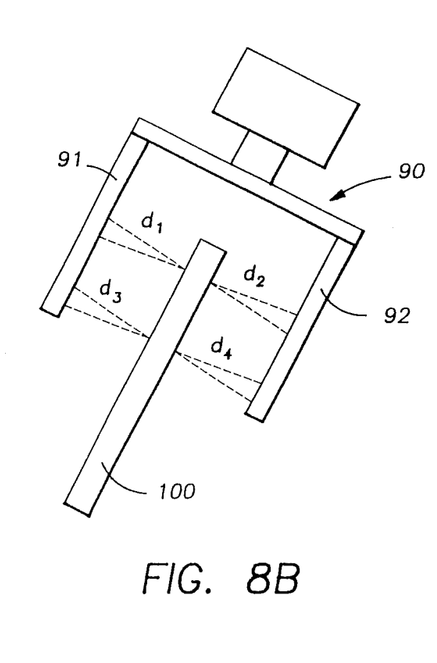

The concepts disclosed in the present invention can be readily adapted to a variety of robotic end effector and industrial grippers. For example, reflective proximity sensors may be used on an industrial parallel jaw gripper, such as shown in FIGS. 8(a) and 8(b), for alignment purposes. As shown in FIG. 8(a), an industrial parallel jaw gripper 90 with parallel jaws 91,92 is initially misaligned with a target 100. By energy beam reflections from the target 100 to the proximity sensors, mounted on the inside surfaces of the jaws 91,92, it is possible from the travel times to determine the ranges $d_1, d_2, d_3$, and $d_4$. The gripper control system such as the computer control system shown in FIG. 2 can then use this information to re-orient the gripper 90 so that eventually $d_1 = d_2 = d_3 = d_4$ as shown in FIG. 8(d).

It will therefore be seen that the invention disclosed herein using reflective proximity sensors represents a new concept in autonomous dexterous robotic grasping. The use of proximity sensors to detect a target and perform approach axis alignment, contour following, target trapping and dynamic re-alignment as part of the grasping sequence is an advance in the capabilities of robotic end effectors. In addition, the proximity sensor signal conditioning circuit allows the sensors to work for a relatively wide range of distances, such as zero to four inches. As the distance to target increases and the reflected signal strength decreases, the programmable gain adjustment feature 57 maintains the dynamic range of a low power reflected signal by increasing the gain to compensate.

It is also to be understood that the foregoing description of a preferred embodiment of the invention has been presented for purposes of illustration and explanation and is not intended to limit the invention to the precise form disclosed. For example, although the energy beams generated by the proximity sensors have been described herein as light beams which are particularly appropriate for applications in the vacuum environment of outer space, it is also possible to use ultra sonic or other transmitters and receivers as the proximity sensors in most other application. It is to be appreciated therefore that various changes may be made by those skilled in the art without departing from the spirit of the invention.

We claim:

1. A system for positioning a dexterous robotic end effector to minimize target escape potential during grasping, said system comprising:
    a robotic end effector in the form of a robotic hand having a plurality of jointed fingers with at least one of said fingers mounted in opposed relation to the others, each said finger comprised of joined segments;
    a plurality of reflective proximity sensors for transmitting a plurality of radiant energy beams and for detecting reflected echoes of said energy beams, said proximity sensors arranged such that one of said sensors is mounted on the inner surface of each finger segment and the proximity sensors on the outermost finger segments of the fingers opposed to said one finger are aligned in linear array to form an outer layer of proximity sensors and the proximity sensors on the finger segments next adjacent to the outermost segments are aligned in linear array to form an inner layer of proximity sensors; and
    control means for guiding said robotic hand in proximity to a target to be grasped thereby and responsive to reflections of the energy beams when intercepted and reflected by a target object for generating electrical signals representing range to target from each proximity sensor detecting a reflection of its energy beam from said target and in response to said signals aligning the approach axis of said robotic hand to the target to maximize the number of outer layer sensors which detect the target, said control means including means for guiding the fingers of the robotic hand to follow the contours of the target in non-contact relation therewith in a trapping movement to minimize target escape potential and following said trapping movement, actuating the robot fingers to close and rigidize the target.

2. A system for positioning a dexterous robotic end effector as set forth in claim 1 further including means for dynamically re-adjusting the end effector alignment with respect to the target during the act of grasping the target.

3. A system for positioning a dexterous robotic end effector as set forth in claim 1 further including means for adjusting the signal strength of said range signals in correspondence with target distance to maintain the dynamic range of a low powered reflection signal.

4. A system for positioning a dexterous robotic end effector as set forth in claim 1 wherein said proximity sensors transmit and detect optical beams of radiant energy.

5. A system for positioning a dexterous robotic end effector as set forth in claim 1 wherein said proximity sensors transmit and detect beams of ultrasonic energy.

6. A system for positioning a dexterous robotic end effector to minimize target escape potential during grasping, said system comprising:
   a robotic end effector in the form of a robotic hand having a plurality of articulated fingers with one of said fingers mounted in opposed relation to the others, each said finger comprised of joined segments;
   a plurality of proximity sensors for transmitting a plurality of radiant energy beams and for detecting reflected echoes of said energy beams, said proximity sensors being arranged such that one of said sensors is mounted on the inner side of each finger segment and the proximity sensors on the outermost finger segments of the fingers opposed to said one finger are aligned to form an outer array of proximity sensors and the proximity sensors on the finger segments next adjacent to the outermost segments are aligned to form an inner array of proximity sensors; and
   control means for guiding said robotic hand in proximity to a target to be grasped thereby and responsive to reflections of the energy beams when intercepted and reflected by the target object for aligning the approach axis of said robotic hand to the target to maximize the number of outer array sensors which detect the target, said control means including means for guiding the fingers of the robotic hand to follow the contours of the target in non-contact relation therewith in a trapping movement to minimize target escape potential and following said trapping movement, actuating the robot fingers to close and rigidize the target.

7. A system for positioning a dexterous robotic end effector as set forth in claim 6 further including means for dynamically re-adjusting the end effector alignment with respect to the target during the act of grasping the target.

8. A system for positioning a dexterous robotic end effector as set forth in claim 6 wherein said proximity sensors transmit and detect optical beams of radiant energy.

9. A system for positioning a dexterous robotic end effector as set forth in claim 6 wherein said proximity sensors transmit and detect beams of ultrasonic energy.

10. A system for positioning a robotic end effector to minimize target escape potential during grasping, said system comprising:
    a robotic end effector having a plurality of fingers with one of said fingers mounted in opposed relation to another of said fingers;
    a plurality of proximity sensors for transmitting a plurality of radiant energy beams, said proximity sensors arranged such that at least two of said sensors are mounted on the inner surface of each finger in spaced relation to one another in the longitudinal axial direction of the finger and the outermost proximity sensors on the fingers are aligned in linear array to form an outer layer of proximity sensors and the proximity sensors next adjacent to the outermost sensors are aligned in linear array to form an inner layer of proximity sensors; and
    control means for guiding said robotic end effector in proximity to a target to be grasped thereby and responsive to reflections of the energy beams when intercepted and reflected by a target object for aligning the approach axis of said robotic end effector to the target to maximize the number of outer layer sensors which detect the target, said control means including means for guiding the fingers of the robotic and effector to follow the contours of the target in non-contact relation therewith in a trapping movement which minimizes target escape potential and following said trapping movement, actuating the fingers to close and rigidize the target.

11. A system for positioning a robotic end effector as set forth in claim 10 further including means for dynamically re-adjusting the end effector alignment with respect to the target during the act of grasping the target.

12. A system for positioning a robotic end effector as set forth in claim 10 wherein said control means includes means for generating electrical signals representing range to target from each proximity sensor detecting a reflection of its energy beam from said target, and means for adjusting signal strength of said range signals in correspondence with target distance so as to maintain the dynamic range of a low powered reflection signal.

13. A method for positioning a dexterous robotic end effector to minimize target escape potential during grasping, wherein the robotic and effector is in the form of a robotic hand having a plurality of jointed fingers with one of said fingers mounted in opposed relation to the others, and each said finger is comprised of joined segments, said method comprising the steps of:
    utilizing a plurality of reflective proximity sensors for transmitting a plurality of radiant energy beams and for detecting reflected echoes of said energy beams and arranging said proximity sensors such that one of said sensors is mounted on the inner surface of each finger segment and the proximity sensors on the outermost finger segments of the fingers opposed to said one finger are aligned in linear array to form an outer layer of proximity sensors and the proximity sensors on the finger segments next adjacent to the outermost segments are aligned in linear array to form an inner layer of proximity sensors;
    guiding said robotic hand in proximity to a target to be grasped in response to reflections of the energy beams when intercepted and reflected by a target object by aligning the approach axis of said robotic hand to the target to maximize the number of outer layers which detect the target; and
    controlling the fingers of the robotic hand to follow the contours of the target in non-contact relation therewith in a trapping movement to minimize target escape potential and following said trapping movement, actuating the robot fingers to close and rigidize the target.

14. A method for positioning a robotic end effector to minimize target escape potential during grasping, wherein the robotic end effector is equipped with a plurality of fingers with one of said fingers mounted in opposed relation to another of said fingers, said method comprising the steps of:

utilizing a plurality of reflective proximity sensors for transmitting a plurality of radiant energy beams and for detecting reflected echoes of said energy beams in an arrangement of said proximity sensors such that one of said sensors is mounted on the inner surface of each finger segment and the proximity sensors on the outermost finger segments of the fingers opposed to said one finger are aligned in linear array to form an outer layer of proximity sensors and the proximity sensors on the finger segments next adjacent to the outermost segments are aligned in linear array to form an inner layer of proximity sensors;

guiding said robotic hand in proximity to a target to be grasped in response to reflections of the energy beams when intercepted and reflected by a target object by aligning the approach axis of said robotic hand to the target to maximize the number of outer layers which detect the target; and controlling the fingers of the robotic hand to follow the contours of the target in non-contact relation therewith in a trapping movement which minimizes target escape potential and following said trapping movement, actuating the robot fingers to close and rigidize the target.

15. A method for positioning a robotic end effector to minimize target escape potential during grasping as set forth in claim 14 which further includes the step of dynamically re-adjusting the end effector alignment with respect to the target during the act of grasping to compensate for target motion.

* * * * *